United States Patent [19]

Yamamoto et al.

[11] 4,125,699

[45] Nov. 14, 1978

[54] ETHYLENE-PROPYLENE RUBBERY COPOLYMER

[75] Inventors: Akira Yamamoto; Masao Shiraishi; Masakatu Isozumi; Masato Yoshikawa, all of Yokkaichi, Japan

[73] Assignee: Japan EP Rubber Co., Ltd., Japan

[21] Appl. No.: 797,855

[22] Filed: May 17, 1977

[30] Foreign Application Priority Data

May 21, 1976 [JP] Japan ................................ 51-57893

[51] Int. Cl.$^2$ ...................... C08F 32/08; C08F 36/20; C08F 210/16; C08F 210/18
[52] U.S. Cl. ............................. 526/169.2; 252/431 R; 526/281; 526/282; 526/283; 526/308; 526/336; 526/348
[58] Field of Search ............... 526/169.2, 281, 282, 526/283, 308, 336, 348

[56] References Cited

U.S. PATENT DOCUMENTS

| | | |
|---|---|---|
| 3,173,903 | 3/1965 | Lukach et al. .................... 526/169.2 |
| 3,457,244 | 7/1969 | Fukuda et al. ....................... 526/283 |
| 3,595,842 | 7/1971 | Schrage et al. ....................... 526/283 |
| 3,674,755 | 7/1972 | Yamamoto et al. .................. 526/283 |
| 3,684,782 | 8/1972 | Longi et al. ........................... 526/282 |
| 3,725,364 | 4/1973 | Wagensommer et al. ........... 526/282 |

*Primary Examiner*—Edward J. Smith
*Attorney, Agent, or Firm*—Wenderoth, Lind & Ponack

[57] ABSTRACT

A linear ethylene-propylene random rubbery copolymer composed of 78 to 85 mole% of an ethylene unit and 15 to 22 mole% of a propylene unit and having a Mooney viscosity (ML$_{1+4}$, 100° C) of 30 to 50 and a molecular weight distribution corresponding to a Q value of 3.5 to 5.5. The rubbery copolymer may further contain a nonconjugated diene unit in an amount of 4 mole% or less based on the total amount of the ethylene, propylene and nonconjugated diene units. The ethylene-propylene copolymer or ethylene-propylene-nonconjugated diene copolymer affords a cable coating material having improved processability, and when blended with polyethylene or polypropylene, gives a blend having good flowability.

7 Claims, 1 Drawing Figure

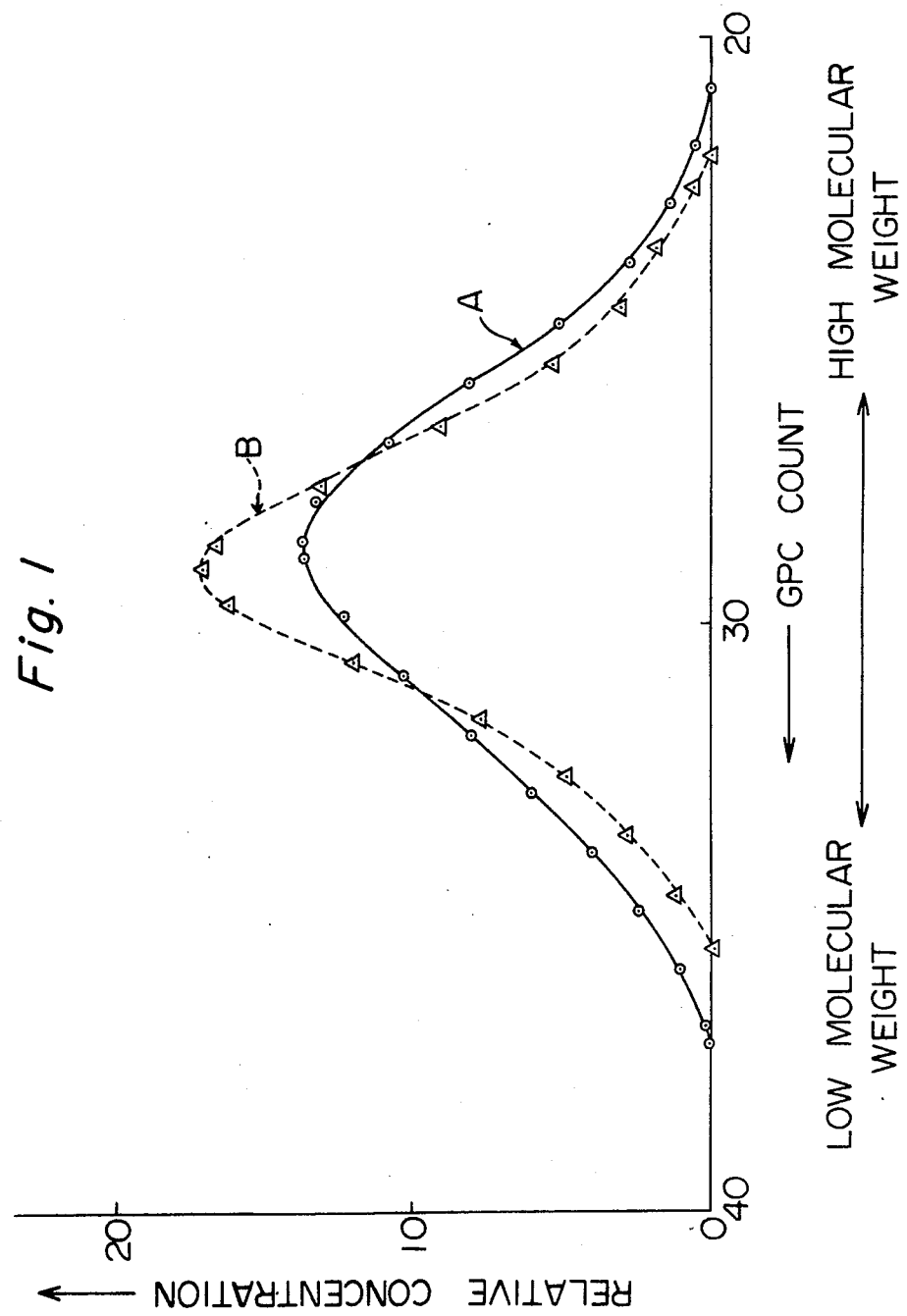

ETHYLENE-PROPYLENE RUBBERY COPOLYMER

This invention relates to a novel ethylene-propylene rubbery copolymer, and more specifically to an ethylene-propylene rubbery binary copolymer (to be abbreviated as EPM) or an ethylene-propylene-nonconjugated diene rubbery terpolymer (to be abbreviated as EPDM) which has a high ethylene content and a broad molecular weight distribution.

Because of superior properties such as weatherability, ozone resistance and thermal stability, EPM and EPDM are known to be useful as automobile materials, electric cable materials, construction materials, industrial materials, and plastic blending materials. However, for use as plastic modifying materials or cable coating materials, these copolymers do not possess entirely satisfactory properties.

For example, when polyethylene or polypropylene is modified by blending EPM or EPDM, the resulting blend usually has poor flowability. Accordingly, EPM and EPDM which do not reduce the flowability of the resulting blends have been desired.

When EPM or EPDM is used as a cable coating material, it is desirable to incorporate the smallest possible amounts of carbon black and clay as reinforcing agents and oils as a softener required for rubber processing, because too much reinforcing agents or softeners would deteriorate the electrical characteristics of rubber.

The conventional EPM or EPDM requires fairly large amounts of compounding ingredients in order to ensure its good masticating or processing characteristics on rolls or in a Banbury mixer, and the resulting material is not entirely satisfactory in such properties as tensile strength, modulus, tear strength, dielectric breakdown voltage, and the outer shape of the extrudate. In order to remedy these defects, it has been desired to provide EPM or EPDM which can be processed well by using small amounts of compounding ingredients.

It is an object of this invention therefore to provide EPM or EPDM having superior electrical characteristics, good flowability and good processing characteristics.

The above object is achieved in accordance with this invention by a linear ethylene-propylene binary random rubbery copolymer or ethylene-propylene-nonconjugated diene ternary random rubbery copolymer composed of 78 to 85 mole% of an ethylene unit and 15 to 22 mole% of a propylene unit or the ethylene unit and the propylene unit in the amounts indicated plus 4 mole% or less, based on the amount of the ternary copolymer, of a nonconjugated diene unit and having a Mooney viscosity ($ML_{1+4}$, 100° C.) of 30 to 50 and a molecular weight distribution corresponding to a Q value of 3.5 to 5.5.

One characteristic feature of the random copolymer of this invention is that it has a high ethylene content of 78 to 85 mole% based on the total amount of the ethylene and propylene units and a broad molecular weight distribution corresponding to a Q value of 3.5 to 5.5, and such EPM or EPDM is novel.

Ethylene-propylene-nonconjugated diene terpolymers having a high ethylene content are known. But the conventional ethylene-propylene terpolymers of a high ethylene content have a very narrow molecular weight distribution with a small Q value. The following table shows the properties of the EPDM of this invention in comparison with those of conventional high ethylene ethylene-propylene terpolymers.

| EPDM | $ML_{1+4}$, 100° C | Iodine value | Ethylene content ($C_2/C_2+C_3$, mole %) | Q value |
|---|---|---|---|---|
| EPDM of the invention | 40 | 20 | 82 | 3.9 |
| Commercially available EPDM (A) | 36 | 12 | 83 | 2.0 |
| Commercially available EPDM (B) | 72 | 11 | 83 | 2.1 |

Various types of EPM or EPDM with a high ethylene content have previously been provided, but none of them have a broad molecular weight distribution.

The EPM or EPDM of the invention has superior electrical characteristics and good processing characteristics because of its high ethylene content, broad molecular weight distribution and relatively low Mooney viscosity. When it is extrusion-coated on cables, a very smooth surface can be obtained. Its good processing characteristics reduce the required amounts of compounding ingredients, and products having superior tensile strength, modulus and tear strength can be obtained. In contrast, when a conventional high ethylene EPDM is extrusion-coated on cables, the coated surface is not smooth but roughened.

When EPM or EPDM of the invention is blended with another resin, for example, a polyolefin such as polyethylene, the resulting blend has better flowability than a blend of conventional EPM or EPDM with the other resin.

The preferred ethylene unit content of the EPM or EPDM of the invention is 80 to 83 mole% when the total amount of the ethylene unit and the propylene unit is 100 mole%. The preferred content of the propylene unit is 17 to 20 mole%. In the EPDM, the preferred content of the nonconjugated diene unit is 0.5 to 4 mole% especially 1.0 to 3.0 mole % when the total amount of the ethylene, propylene and nonconjugated diene unit is 100 mole%.

Examples of the nonconjugated diene that can be used to produce EPDM of the invention are 1,4-hexadiene, 1,5-cyclooctadiene, methyltetrahydroindene, ethyltetrahydroindene, dicyclopentadiene, 2-methylnonbornadiene, 5-methylene-2-norbornene, and 5-ethylidene-2-norbornene. Of these, dicyclopentadiene and 5-ethylidene-2-norbornene are especially preferred.

The ratio of the ethylene unit and the propylene unit in the rubbery copolymer of the invention can be determined from the ratio of absorbance at 4310 $cm^{-1}$, a characteristic infrared absorption for ethylene, and that at 1163 $cm^{-1}$, a characteristic infrared absorption for propylene. The ethylene and propylene contents are determined by the method of G. Natta: Chem. Ind. (Milan) 39, 733, (1957) using these peaks. The content of the nonconjugated diene as a third component can be measured from the absorbance of the diene in its characteristic infrared absorption band, for example, at 1683 $cm^{-1}$, 1610 $cm^{-1}$ or 970 $cm^{-1}$ when the diene is 5-ethylidene-2-norbornene, dicyclopentadiene or 1,4-hexadiene, respectively.

The preferred Q value of the EPM or EPDM of the present invention is 3.7 to 4.5.

The Q value which is a measure for the molecular weight distribution of EPM or EPDM of the invention is defined as $$Q = M_w/M_n$$

wherein $M_w$ is the weight average molecular weight, and $M_n$ is the number average molecular weight.

The Q value is determined by the following method in accordance with the disclosure at page 105 of Nippon Gomu Kyokai Shi (Journal of Japan Rubber Society), Vol. 45, No. 2 (1972).

(1) Preparation of a log $K \cdot M^{\alpha+1}$-GPC count correlation chart:

Using several kinds of polystyrene having known molecular weights, the intrinsic viscosities $[\eta]$ of the polymers and their GPC (Gel Permeation Chromatograph) counts are measured, and a correlation chart of $\log[\eta] \cdot M$ and the GPC counts is prepared. Then, on the basis of the relation $\log[\eta] \cdot M = \log K \cdot M^{\alpha+1}$, a correlation chart of log $K \cdot M^{\alpha+1}$-GPC count is prepared.

(2) Preparation of samples:

A sample EPM or EPDM (to be referred to merely as rubber) is cut to pieces, and weighed to 70 mg by a chemical balance. The sample rubber is placed in a three-necked flask, and 10 mg of an antioxidant (Irganox 1076, a trademark for a product of Ciba-Geigy), and 25 ml of tetrahydrofuran are added. The mixture is heated to 55° C. for 30 minutes, and after pressure releasing, is allowed to cool for 10 minutes. The mixture is shaken at 25° C. for 30 minutes to dissolve the polymer. Then, the gel is separated by filtration on a 80-mesh wire gauze. The filtrate is filtered through a filter including a No. 4 filter paper, a GA-200 glass filter and a No. 5 in a sandwich structure. The filtrate is further filtered through a filter including a 0.5 $\mu$ millipore filter, a GA-200 glass filter and a No. 4 filter paper in a sandwich structure. The filtrate is analyzed by a GPC device.

(3) Conditions for GPC measurement:
(a) Device: HLC-801A type, a product of Toyo Soda Co., Ltd.
(b) Column: H-3 type, a product of Toyo Soda Co., Ltd.
(c) Amount of the sample: 3ml
(d) Flow rate: 1.0 ml/min.
(e) Temperature: 40° C.
(f) Recorder chart speed: 10 mm/min.
(g) Pressure: 35 kg/cm$^2$ (4) The molecular weight M is determined from the GPC pattern chart of the sample obtained by the analysis described in (2) above and the log $KM^{\alpha+1}$-GPC count correlation chart prepared in (1).

(5) From the molecular weight M of each fraction determined in (4) above, Q is determined from the following equations.

$$Q = (M_w/M_n)$$

$$Mn = (\Sigma MiNi/\Sigma Ni)$$

$$M_w = (\Sigma Mi^2 Ni/\Sigma MiNi)$$

wherein $Mi$ is the molecular weight of fraction $i$, and $Ni$ is the number of molecules of fraction $i$.

The linear random ethylene-propylene rubbery binary copolymer or ethylene-propylene-nonconjugated diene rubbery terpolymer of this invention has a Mooney viscosity ($ML_{1+4}$, 100° C.), as measured by the method of JIS K-6300, of 30 to 50, preferably 34 to 42.

The EPM or EPDM of the invention may contain up to 27% by weight of a gel insoluble in cyclohexane. Preferably, the gel content is not more than 20% by weight.

The cyclohexane-insoluble gel of the EPM or EPDM of the present invention is measured as follows: Small pieces of a sample (0.5 g) are prepared, and placed for 24 hours in 100 cc of cyclohexane at 30° C. in the absence of agitation. The solution is filtered on a 80-mesh filter, and the percentage of the polymer which cannot pass through the filter is determined and made the gel content.

Since the EPM or EPDM of the invention contains a gel, its molecular weight cannot be accurately shown. When it is dissolved in cyclohexane at 40° C., its cyclohexane-soluble portion has a viscosity average molecular weight ($\overline{M}$ v) of about 70,000 to 130,000.

High ethylene EPM or EPDM having an ethylene content of as high as more than 70 mole% is not a complete crystal, but contains so-called microcrystals. The rubbery copolymers of this invention also contain such microcrystals. In the present invention, the amount of such microcrystals is determined by differential scanning calorimetry (DSC) using a device of DT-20S type (a product of Shimadzu Seisakusho Ltd.) under the following conditions.

Temperature raising rate: 20° C./min.
Chart speed: 20 mm/min.
Sensitivity: ± 5 $\mu$V
Amount of the sample: 20 mg As a standard sample, polyethylene (YE-30, a product of Mitsubishi Petrochemical Company Ltd.) having a density of 0.920 is used, and its endothermic area in DSC is taken as 1000. The relative amount of crystals in each sample is determined by comparison with the standard sample. It has been found that the relative amount of crystals in the rubbery copolymers of this invention by DSC is 80 to 160.

The EPM or EPDM of this invention is produced by copolymerizing ethylene and propylene or copolymerizing these with a nonconjugated diene in a solvent in the presence of a catalyst composed of an organoaluminum compound and a vanadic acid ester of the general formula $VO(OR)_n X_{3-n}$ wherein R is an alkyl group containing 6 to 12 carbon atoms, n is an integer of 1 to 3, and X is chlorine or bromine in which the concentration of the vanadium component is $0.6 \times 10^{-3}$ to $2.0 \times 10^{-3}$ gram-atom as vanadium per liter of the reaction solvent, and the gram-atomic ratio of Al/V is 2 to 6.

The vanadium component of the catalyst used in the production of the rubbery copolymers of the invention is a vanadic acid ester expressed by the general formula

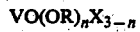
$$VO(OR)_n X_{3-n}$$

wherein R is an alkyl group containing 6 to 12 carbon atoms, n is an integer of 1 to 3, and X is chlorine or bromine. The vanadic acid ester can be easily prepared by reacting an aliphatic monohydric alcohol containing 6 to 12 carbon atoms with vanadium oxytrichloride at room temperatue under atmospheric pressure by a known method, for example the method disclosed in U.S. Pat. No. 3,457,244.

Examples of the usable alcohol are n-hexyl alcohol, sec-hexyl alcohol, n-heptyl alcohol, 2-ethylhexanol, n-octyl alcohol, and decyl alcohol. Of these, primary alcohols which do not substantially contain moisture are preferred. The amount of the alcohol is 0.01 to 5 moles, preferably 0.5 to 3 moles, per mole of the vanadium oxytrichloride.

The reaction mixture is used directly as a vanadium catalyst component, or after separating the vanadic acid ester by distillation. Generally, however, the reaction mixture is preferably used as such without isolating the vanadic acid ester.

The organoaluminum compound, the other component of the catalyst, may be any compound which is generally used as catalyst in the production of EPM or EPDM. Examples of suitable organoaluminum compounds are alkylaluminum halides such as alkylaluminum sesquihalides, dialkylaluminum monohalides and mixtures of dialkylaluminum monohalides and monoalkylaluminum dihalides. Of these, alkylaluminum sesquihalides of the general formula $Al_2R_3X_3$ wherein R is an alkyl group containing 1 to 6 carbon atoms and X is chlorine or bromine, such as ethylaluminum sesquichloride, isobutylaluminum sesquichloride or ethylaluminum sesquibromide, are especially preferred.

In the preparation of the rubbery copolymers of the present invention, it is essential that the amount of the vanadium component of the catalyst be $0.6 \times 10^{-3}$ to $2.0 \times 10^{-3}$ gram-atom per liter of solvent, preferably $0.6 \times 10^{-3}$ to $1.8 \times 10^{-3}$ gram-atom as vanadium per liter of solvent, and the gram-atomic ratio of Al/V be adjusted to 2 to 6, preferably 2.5 to 4.5. If the concentration of the vanadium component is lower than the lower limit specified above, polymers with a Q value of at least 3.5 cannot be obtained. If the concentration of the vanadium component exceeds the upper limit specified above, no appreciable increase in effect can be obtained, and it is economically undesirable.

In the production of the rubbery copolymers of this invention, it is important to adjust the Al/V gram-atomic ratio to as low as not more than 6. If, however, the Al/V ratio is lower than 2, the activity of the catalyst decreases owing to the presence of traces of impurities in the polymerization system, and the reaction becomes extremely unstable. On the other hand, if the Al/V ratio exceeds 6, the molecular weight distribution becomes sharp, and polymers with the desired Q values cannot be obtained.

It has been generally considered that when the Al/V ratio is decreased, especially to below 8, a gel-like polymer is formed in an increasing amount even in the production of an ordinary EPM or EPDM having an ethylene content of about 55 to 65%, and the use of a catalyst having a low Al/V ratio is not preferred. It is surprising therefore that according to the process of this invention, polymers can be produced with inhibited formation of gels by using a specific catalyst system having an Al/V ratio of as low as 2 to 6 under specific polymerization conditions. In fact, polymerization with the low Al/V ratio described above is necessary in order to obtain EPM or EPDM having an ethylene content of as high as 78 to 85 mole% and a broad molecular weight distribution with a Q value of 3.5 to 5.5 by the process of this invention.

The reaction of forming the copolymer of this invention can be conveniently performed by feeding ethylene and propylene, or ethylene, propylene and a nonconjugated diene into a reactor containing a solvent-catalyst mixture obtained by adding the vanadium component and aluminum component of the catalyst to the solvent. For molecular weight adjustment, the reaction may be carried out in the presence of hydrogen. In this case, hydrogen is fed into a reactor containing the solvent-catalyst mixture together with the starting monomers.

In performing the copolymerization reaction in accordance with this invention, 1 mole of propylene and 0.8 to 1.6 moles of ethylene are fed into the reaction system. In the case of producing EPDM, the nonconjugated diene is fed in an amount of 0.004 to 0.04 mole per mole of ethylene and propylene combined.

The polymerization temperature used in the production of EPM or EPDM of the invention is 20° to 60° C., preferably 40° to 55° C. The polymerization pressure is generally from atmospheric pressure to 10 kg/cm².G.

The Mooney viscosity and ethylene content of the EPM or EPDM of this invention can be adjusted mainly by changing the concentration of hydrogen used for molecular weight adjustment and the ethylene/propylene ratio in the monomeric mixture to be polymerized. This affords polymers with the desired Mooney viscosities and ethylene contents.

The solvent used in the polymerization includes, for example, aliphatic hydrocarbons such as pentane, hexane or heptane, cycloaliphatic hydrocarbons such as cyclohexane or methylcyclohexane, aromatic hydrocarbons such as benzene, toluene or xylene, halogenated hydrocarbons such as tetrachloroethylene or chlorobenzene, and mixtures of these.

The polymerization may be performed either continuously or batchwise.

The following examples illustrate the present invention in more detail.

EXAMPLE 1 AND COMPARATIVE EXAMPLES 1 TO 5

(A) Preparation of a vanadic acid ester

A 110-liter glass-lined make-up tank was charged with 60 liters of n-hexane, and with bubbling by stirring and a nitrogen gas, 1,230 g of $VOCl_3$ was added. While maintaining the temperature of the make-up tank at 30°±5° C., 1,390 g of 2-ethylhexyl alcohol was gradually added. Bubbling by stirring and a nitrogen gas was performed for about 3 hours, and after confirming that no chlorine gas evolved, the resulting mixed solution was used as a vanadium catalyst component.

(B) Preparation of EPDM

In a 200-liter autoclave, ethylene, propylene and 5-ethylidene-2-norbornene were copolymerized continuously under the following conditions.

| | |
|---|---|
| Amount of n-hexane fed: | 68 liters/hour |
| Residence time: 0.88 hour | |
| Ethylene/propylene molar ratio in the vapor phase: | 1.7 |
| Amount of 5-ethylidene-2-norbornene fed: | 800 cc/hour |
| Concentration of hydrogen in the vapor phase: | 6% |
| Catalyst: ethylaluminum sesquichloride ($3.2 \times 10^{-3}$ gram-atom/liter of n-hexane as aluminum) plus the reaction mixture of vanadium oxytrichloride and 2-ethylhexanol prepared in (A) above (alcohol/$VOCl_3$ = 1.5, mole ratio; $1.2 \times 10^{-3}$ gram-atom/liter of n-hexane as vanadium) | |
| Polymerization temperature: 41° C | |
| Polymerization pressure: 4.5 kg/cm².G | |

A small amount of water as a short stopper was added to the polymerization product withdrawn from the autoclave, and the solvent was removed by steam distillation. The resulting rubbery terpolymer was dried in a finishing step. It had the following properties.

Mooney viscosity ($ML_{1+4}$, 100° C): 38
Ethylene content: 82 mole%
Propylene content: 18 mole%
Diene content: 1.5 mole%
Q value: 3.9
Amount of microcrystals determined by DSC: 121
Gel insoluble in cyclohexane: 17.9% by weight
Tg(*1): −53° C
Tm(*2): 47° C
Tensile strength (*3): 69 kg/cm$^2$
Elongation (*4): 1280%

(*1): Glass transition point measured by the DSC method.
(*2): Melting point measured by the DSC method.
(*3): Measured by JIS K-6301
(*4): Measured by JIS K-6301.

The above ingredients were masticated at 70° C. for 4.5 minutes using a BR-type Banbury mixer at 76 rpm, and then the mixture was compounded with 1.5 parts by weight of p,p'-dibenzoylquinone dioxime and 2.7 parts by weight of dicumyl peroxide by 6-inch rolls kept at 50° C. The nip of the rolls was 1.5 mm, and the rotating speeds of the two rolls were 24 rpm and 33.6 rpm, respectively.

The properties of the compounded rubber were tested, and the results obtained are shown in Table 1.

For comparison, Table 1 also shows the results of testing of the physical properties of five types of compounded rubbers prepared by using ethylene-propylene terpolymers which are outside the scope of the invention.

Table 1

|  |  | Example 1 | Comparative Example 1 | Comparative Example 2 | Comparative Example 3 | Comparative Example 4 |
|---|---|---|---|---|---|---|
| Raw rubber | $ML_{1+4}$, 100° C | 38 | 37 | 32 | 34 | 36 |
|  | Ethylene content (mole%) | 82 | 75 | 74 | 81 | 83 |
|  | Propylene content (mole%) | 18 | 25 | 26 | 19 | 17 |
|  | Diene content (mole%) | 1.5 (ENB) | 1.4 (ENB) | 1.7 (ENB) | 1.2 (ENB) | 1.4 (1,4HD) |
|  | Q value | 3.9 | 3.2 | 3.7 | 2.0 | 2.0 |
|  | Amount of crystals by DSC | 121 | 66 | 75 | 86 | 98 |
|  | Cyclohexane-insoluble gel (% by weight) | 17.9 | 12.4 | 4.7 | 0.3 | 9.4 |
| Property of raw rubber | Tensile strength (kg/cm$^2$) | 69 | 26 | 14 | 29 | 31 |
|  | Elongation (%) | 1280 | 1990 | 2260 | 1640 | 1000 |
| Properties of compounded rubber | Tensile strength (kg/cm$^2$) | 145 | 87 | 70 | 68 | 68 |
|  | 200% Modules (kg/cm$^2$) | 40 | 32 | 34 | 37 | 41 |
|  | Elongation(%) | 570 | 520 | 600 | 520 | 540 |
|  | Hardness (JISA) | 72 | 63 | 60 | 70 | 71 |
|  | Amount extruded (cc/min.) | 160 | 146 | 140 | 155 | 130 |
|  | Shape (16 points represent a perfectly satisfactory shape) | 16 | 15 | 15 | 4 | 12 |

ENB: 5-ethylidene-2-norbornene; 1,4HD: 1,4-hexdiene

The molecular weight distribution pattern of this polymer determined by GPC is shown by solid line A in FIG. 1. For comparison, the molecular weight distribution pattern of EPDM EP-82 grade (Q value 2.5) (a product of Japan EP Rubber Co., Ltd.) determined by GPC is shown by dotted line B in FIG. 1.

(C) Production of compounded rubber

A blend of the following recipe was prepared using EPDM produced in (B) above

| EPDM | 100 parts by weight |
|---|---|
| Ultrafine magnesium silicate | 60 |
| Stearic acid | 1 |
| Zinc oxide | 5 |
| Naphthenic oil | 3 |
| Paraffin | 1 |

The tensile strength, elongation and hardness were measured in accordance with JIS K-6301. The samples used were vulcanized at 160° C. for 20 minutes.

The extrusion test (for the amount of extrusion and shape) was performed in accordance with ASTM D-2230 using a tube type device (diameter 50 mm, screw temperature 70° C., heat 90° C., 20 rpm; fitted with a Garvey die).

EXAMPLES 2 TO 13

The procedure of Example 1 was repeated except that the polymerization conditions used were changed as shown in Table 2. The properties of the resulting rubbery copolymers are shown in Table 3.

Table 2

| | Example | 2 | 3 | 4 | 5 |
|---|---|---|---|---|---|
| Polymerization conditions | Pressure (kg/cm².G) | 4.5 | 4.5 | 4.5 | 4.5 |
| | Temperature (° C) | 41 | 41 | 40 | 41 |
| | Amount of n-hexane (liter/hr) | 68 | 68 | 68 | 68 |
| | Residence time (hours) | 0.88 | 0.88 | 0.88 | 0.88 |
| | $C_2/C_3$ mole ratio in the vapor phase | 1.7 | 1.7 | 1.7 | 1.7 |
| | Hydrogen concentration (mole %) | 14 | 7 | 6.5 | 5.5 |
| | Amount of the diene (cc/hr) | 1500 | 800 | 800 | 800 |
| | Amount of the organoaluminum compound (gram-atom/l-hexane) | $3.2 \times 10^{-3}$ | $3.2 \times 10^{-3}$ | $3.2 \times 10^{-3}$ | $3.2 \times 10^{-3}$ |
| | Amount of the vanadium compound (gram-atom/l of hexane) | $1.2 \times 10^{-3}$ | $1.2 \times 10^{-3}$ | $1.2 \times 10^{-3}$ | $1.2 \times 10^{-3}$ |
| | Al/V ratio | 2.7 | 2.7 | 2.7 | 2.7 |
| | Type of the organoaluminum compound | $Al_2Et_3Cl_3$ | $Al_2Et_3Cl_3$ | $Al_2Et_3Cl_3$ | $Al_2Et_3Cl_3$ |
| | Type of the vanadium compound | $VOCl_3$-$C_8OH$ | $VOCl_3$-$C_8OH$ | $VOCl_3$-$C_8OH$ | $VOCl_3$-$C_8OH$ |

| 6 | 7 | 8 | 9 | 10 | 11 | 12 | 13 |
|---|---|---|---|---|---|---|---|
| 4.5 | 4.5 | 4.5 | 5 | 5 | 4.5 | 4.5 | 4.5 |
| 41 | 42 | 44 | 45 | 45 | 41 | 45 | 45 |
| 68 | 68 | 68 | 92 | 92 | 68 | 68 | 68 |
| 0.88 | 0.88 | 0.88 | 0.65 | 0.65 | 0.88 | 0.88 | 0.88 |
| 1.7 | 1.6 | 1.9 | 1.2 | 1.7 | 1.6 | 2.1 | 2.2 |
| 4.5 | 7 | 11 | 2 | 17 | 11 | 4 | 2 |
| 800 | 800 | 800 | 0 | 2330 | 800 | 800 | 800 |
| $3.2 \times 10^{-3}$ | $2.9 \times 10^{-3}$ | $2.9 \times 10^{-3}$ | $1.8 \times 10^{-3}$ | $2.2 \times 10^{-3}$ | $4.8 \times 10^{-3}$ | $2.5 \times 10^{-3}$ | $3.8 \times 10^{-3}$ |
| $1.2 \times 10^{-3}$ | $1.0 \times 10^{-3}$ | $1.0 \times 10^{-3}$ | $0.81 \times 10^{-3}$ | $1.0 \times 10^{-3}$ | $1.2 \times 10^{-3}$ | $1.2 \times 10^{-3}$ | $1.8 \times 10^{-3}$ |
| 2.7 | 2.9 | 2.9 | 2.2 | 2.2 | 4.0 | 2.1 | 2.1 |
| $Al_2Et_3Cl_3$ | $Al_2Et_3Cl_3$ | $Al_2Et_3Cl_3$ | $Al_2Et_3Cl_3$ | $Al_2Et_3Cl_3$ | $Al_2Et_3Cl_3$ | $Al_2Et_3Cl_3$ | $Al_2Et_3Cl_3$ |
| $VOCl_3$-$C_6OH$ | $VOCl_3$-$C_6OH$ | $VOCl_3$-$C_6OH$ | $VOCl_3$-$C_8OH$ | $VOCl_3$-$C_8OH$ | $VOCl_3$-$C_8OH$ | $VOCl_3$-$C_8OH$ | $VOCl_3$-$C_8OH$ |

$C_6OH$: n-hexanol
$C_8OH$: 2-ethylhexanol

Table 3

| | Example | 2 | 3 | 4 | 5 |
|---|---|---|---|---|---|
| Properties of raw rubber | $ML_{1+4}$, 100° C | 34 | 32 | 35 | 43 |
| | Ethylene content (mole%) | 80 | 82 | 82 | 82 |
| | Propylene content (mole%) | 20 | 18 | 18 | 18 |
| | Type of the diene | DCP | ENB | ENB | ENB |
| | Diene content (mole%) | 2.5 | 1.5 | 1.5 | 1.5 |
| | Q value | 3.9 | 3.9 | 3.8 | 3.9 |
| | Amount of crystals by DSC | 106 | 121 | 120 | 120 |
| | Cyclohexane-insoluble gel (% by weight) | 19.0 | 16.5 | 17.9 | 18.1 |

| 6 | 7 | 8 | 9 | 10 | 11 | 12 | 13 |
|---|---|---|---|---|---|---|---|
| 50 | 38 | 38 | 38 | 38 | 38 | 38 | 38 |
| 82 | 78 | 85 | 82 | 82 | 82 | 82 | 82 |
| 18 | 22 | 15 | 18 | 18 | 18 | 18 | 18 |
| ENB | ENB | ENB | — | DCP | ENB | ENB | ENB |
| 1.5 | 1.5 | 1.5 | — | 4.0 | 1.5 | 1.5 | 1.5 |
| 3.9 | 3.9 | 3.8 | 3.8 | 3.9 | 3.6 | 4.5 | 5.5 |
| 120 | 100 | 130 | 130 | 120 | 110 | 125 | 140 |
| 17.1 | 10 | 23 | 22 | 18 | 16 | 22 | 25 |

DCP: dicyclopentadiene
ENB: 5-ethylidene-2-norbornene

What we claim is:

1. A linear ethylene-propylene random rubbery copolymer composed of 78 to 85 mole% of an ethylene unit and 15 to 22 mole% of a propylene unit and having a Mooney viscosity ($ML_{1+4}$, 100° C.) of 30 to 50 and a molecular weight distribution corresponding to a Q value of 3.5 to 5.5.

2. The rubbery copolymer of claim 1 which further includes a nonconjugated diene unit in an amount of 4 mole% or less based on the total amount of the ethylene, propylene and nonconjugated diene units.

3. The rubbery copolymer of claim 2 wherein the nonconjugated diene is a member selected from the group consisting of 1,4-hexadiene, 1,5-cyclooctadiene, methyltetrahydroindene, ethyltetrahydroindene, dicyclopentadiene, 2-methyl-norbornadiene, 5-methylene-2-norbornene and 5-ethylidene-2-norbornene.

4. The rubbery copolymer of claim 1 which contains a cyclohexane-insoluble gel in an amount of up to 27% by weight.

5. In a process which comprises reacting propylene with ethylene in the presence of a reaction solvent and a catalyst composed of an organoaluminum compound and a vanadium compound to produce an ethylene-propylene rubbery copolymer composed of 78 to 85 mole% of an ethylene unit and 15 to 22 mole% of a propylene unit, the improvement wherein the catalyst is composed of an organoaluminum compound and a vanadic acid ester of the general formula $$VO(OR)_n X_{3-n}$$

wherein R is an alkyl group containing 6 to 12 carbon atoms, $n$ is an integer of 1 to 3, and X is chlorine or bromine, the aluminum/vanadium atomic ratio being 2 to 6, and the amount of the catalyst being $0.6 \times 10^{-3}$ to $2.0 \times 10^{-3}$ gram-atom, as vanadium, per liter of the reaction solvent.

6. The process of claim 5 wherein the ethylene and propylene are reacted with a nonconjugated diene thereby to form a terpolymer composed of 78 to 85 mole% of an ethylene unit and 15 to 22 mole% of a propylene unit, both being based on the total amount of the ethylene and propylene units, and 4 mole% or less, based on the total amount of the ethylene, propylene and nonconjugated diene units, of a nonconjugated diene.

7. The process of claim 5 wherein the organoaluminum compound is a member selected from the group consisting of alkylaluminum sesquihalides, dialkylaluminum monohalides, and mixtures of dialkylaluminum monohalides and monoalkylaluminum dihalides.